United States Patent [19]

Nishimura

[11] Patent Number: 5,031,217
[45] Date of Patent: Jul. 9, 1991

[54] SPEECH RECOGNITION SYSTEM USING MARKOV MODELS HAVING INDEPENDENT LABEL OUTPUT SETS

[75] Inventor: Masafumi Nishimura, Yokohama, Japan

[73] Assignee: International Business Machines Corporation, Armonk, N.Y.

[21] Appl. No.: 411,297

[22] Filed: Sep. 21, 1989

[30] Foreign Application Priority Data

Sep. 30, 1988 [JP] Japan .................. 63-244502

[51] Int. Cl.$^5$ ............................................ G10L 7/08
[52] U.S. Cl. ...................................................... 381/43
[58] Field of Search ................................... 381/41–46; 364/513.5

[56] References Cited

U.S. PATENT DOCUMENTS

| | | | |
|---|---|---|---|
| 4,783,804 | 11/1988 | Juang et al. | 381/43 |
| 4,827,521 | 5/1989 | Bahl et al. | 381/43 |
| 4,829,577 | 5/1989 | Kuroda et al. | 381/45 |

OTHER PUBLICATIONS

Bahl, L. R., et al "Acoustic Markov Models used in the Tangora Speech Recognition System", Proceedings of ICASSP '88, Apr. 1988, S11-3.
Bahl, L. R. et al "A Maximum Likelihood Approach to Continuous Speech Recognition", *IEEE Trans. Pattern Analysis and Machine Intelligence*, vol. PAMI-5, No. 2, pp. 179-190, 1983.
Jelinek, F. "Continuous Speech Recognition By Statistical Methods", *Proc. IEEE*, vol. 64, 1976, pp. 532-556.
Levinson, S. E., et al "An Introduction to the Application of the Theory of Probabilistic Functions of the Markov Process of Automatic Speech Recognition", *The Bell System Technical Journal*, vol. 64, No. 4, pp. 1035-1074, Apr. 1983.

Primary Examiner—Gary V. Harkcom
Assistant Examiner—John A. Merecki
Attorney, Agent, or Firm—Marc D. Schechter

[57] ABSTRACT

A speech recognition system measures the values of at least two classes of features of an utterance: (1) a first class whose value is related to the frequency spectrum of the utterance, and (2) a second class whose value is related to the variation with time of the "first class" value of the utterance. Word baseforms are constructed from Markov model baseform units. Each output-producing transition of a baseform unit produces outputs from both classes. However, for each output-producing transition, the probabilities of producing outputs from the first class are independent of the probabilities of producing outputs from the second class.

8 Claims, 7 Drawing Sheets

| Ma | Mc | B1 | B2 | B3 |
|---|---|---|---|---|
| 1 | 1 | 0.1 | 0.8 | 0.1 |
| 1 | 2 | 0.1 | 0.7 | 0.2 |
| 1 | 3 | 0.1 | 0.7 | 0.2 |
| ⋮ | ⋮ | ⋮ | ⋮ | ⋮ |
| 1 | 128 | 0.2 | 0.6 | 0.2 |
| 2 | 1 | 0.3 | 0.6 | 0.1 |
| 2 | 2 | 0.1 | 0.8 | 0.1 |
| ⋮ | ⋮ | ⋮ | ⋮ | ⋮ |
| 128 | 127 | 0.2 | 0.7 | 0.1 |
| 128 | 128 | 0.2 | 0.7 | 0.1 |

P(La|Ma)

| Ma\La | 1 | 2 | 3 | ⋯ | 127 | 128 |
|---|---|---|---|---|---|---|
| 1 | 0.8 | 0.01 | 0.02 | | 0.01 | 0.02 |
| 2 | 0.01 | 0.9 | 0.01 | | 0.02 | 0.01 |
| 3 | 0.01 | 0.1 | 0.7 | | 0.02 | 0.01 |
| ⋮ | | | | | | |
| 127 | 0.02 | 0.1 | 0.01 | | 0.6 | 0.1 |
| 128 | 0.01 | 0.01 | 0.01 | | | 0.9 |

P(Lc|Mc)

| Mc\Lc | 1 | 2 | 3 | ⋯ | 127 | 128 |
|---|---|---|---|---|---|---|
| 1 | 0.7 | 0.01 | 0.1 | | 0.01 | 0.02 |
| 2 | 0.1 | 0.6 | 0.1 | | 0.01 | 0.01 |
| 3 | 0.01 | 0.02 | 0.8 | | 0.02 | 0.01 |
| ⋮ | | | | | | |
| 127 | 0.01 | 0.02 | 0.01 | | 0.5 | 0.01 |
| 128 | 0.05 | 0.05 | 0.01 | | 0.01 | 0.8 |

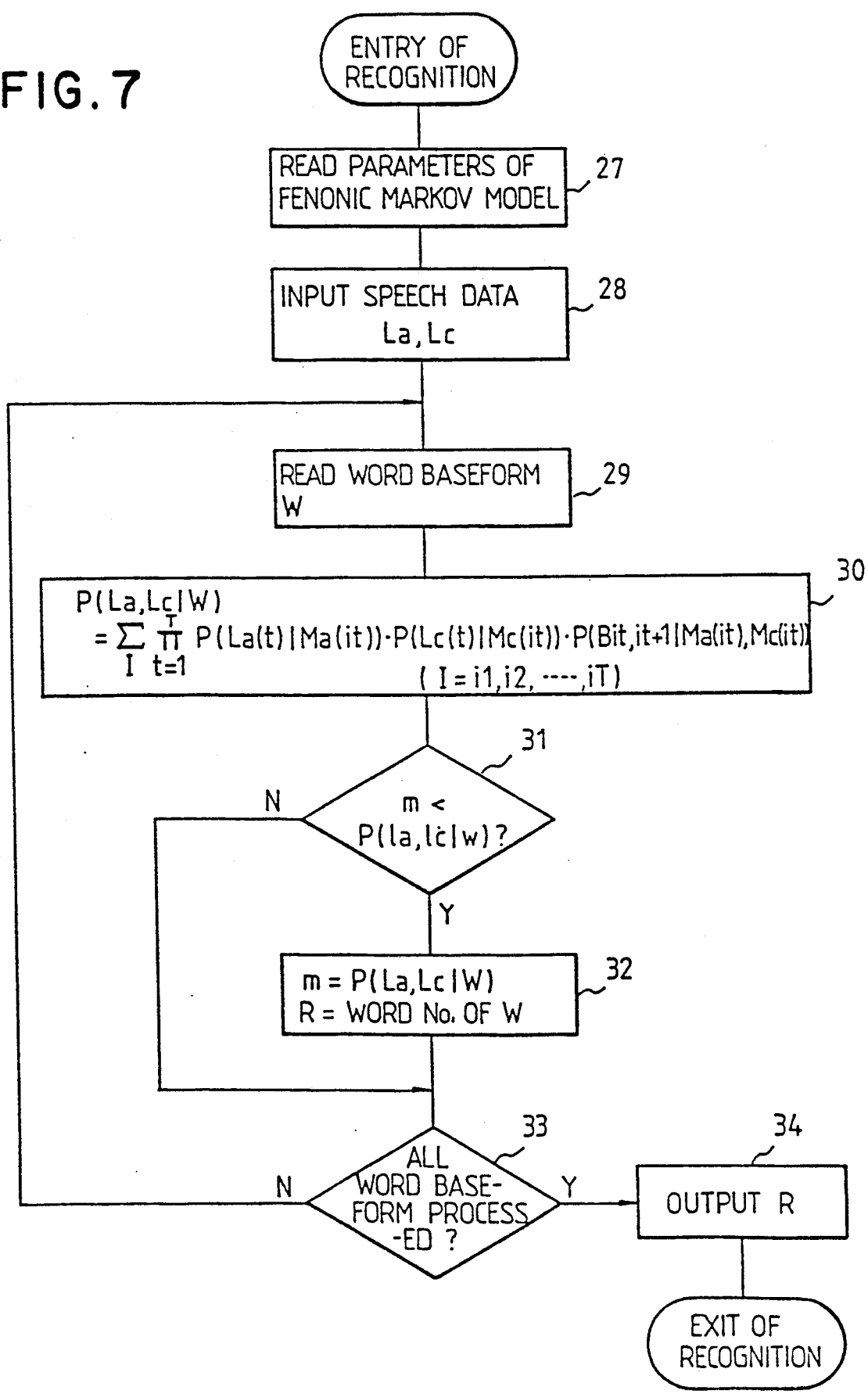

SPEECH RECOGNITION SYSTEM USING MARKOV MODELS HAVING INDEPENDENT LABEL OUTPUT SETS

BACKGROUND OF THE INVENTION

The invention relates to a speech recognition system utilizing Markov models, and more particularly to a system capable of highly accurate recognition without a significant increase in the amount of computation and the storage capacity.

Speech recognition utilizing Markov models operates probabilistically. For example, one such technique establishes a Markov model for each word. Generally, the Markov model is defined with a plurality of states and transitions between these states. Each transition from a state has a probability of occurrence. Each transition has a probability of producing a label (symbol) at the transition.

After being frequency-analyzed for a predetermined cycle (called a "frame"), the unknown input speech is converted into a label stream through vector quantization. Then, the probability of each of the word Markov models generating the label stream is determined on the basis of the above-mentioned transition occurrence probabilities, and the label output probabilities (called "parameters" hereinafter). The input speech is recognized as the word whose Markov model has the highest label generating probability.

According to speech recognition utilizing Markov models, the parameters may be statistically estimated, thereby improving the recognition accuracy. This recognition technique is detailed in the following papers:

(1) "A Maximum Likelihood Approach to Continuous Speech Recognition," IEEE Transactions on Pattern Analysis and Machine Intelligence, Vol. PAMI-5, No. 2, pp. 179-190, 1983, by Lalit R. Bahl, Frederick Jelinek and Robert L. Mercer.

(2) "Continuous Speech Recognition by Statistical Methods," Proceedings of the IEEE, Vol. 64, 1976, pp. 532-556 by Frederick Jelinek.

(3) "An Introduction to the Application of the Theory of Probabilistic Functions of the Markov Process of Automatic Speech Recognition," The Bell System Technical Journal, Vol 64, No. 4, pp. 1035-1074, Apr. 1983 by S.E. Levinson, L.R. Rabiner and M.M. Sondhi.

In speech perception, it has been noted that the transition spectral pattern of speech is an important characteristic for speech recognition, especially for consonant recognition, and is insensitive to noise. A characteristic of a typical Markov model is a lack of the ability to describe such transitional characteristics.

Recently, there have been proposed several Markov models representing such transitional characteristics of speech. However, these models consist of a large number of parameters, not only causing problems in the amount of storage, but also having a disadvantage in that they need a large amount of training speech data for estimating parameters.

For example, when it is intended to estimate models with a spectral pattern over adjacent m frames as the feature quantity, parameters of about $N^m$ for each state must be estimated, even when the label output probability is assigned to each state of the model where N is the number of the patterns for each frame (the number of the label prototypes for the vector quantization) If m is a large number, the model cannot be constructed because of the enormous amount of storage required, and the enormous amount of training speech needed for estimating the model parameters. Matrix quantization of the pattern over m frames may reduce the number of the parameters by some degree. However, the number cannot be significantly reduced because of the quantization error. This technique also has a disadvantage in that the amount of calculation and storage required for quantization becomes enormous.

A method directly taking the transitional pattern into the Markov model formulation has also been suggested. In this method, as the Markov model label output probability is $P(L(t)|L(t-1), L(t-2)... L(t-m), S)$, where L(m) and S represent a label and a state at a time t, respectively. In this technique, $N^m$ parameters must still be estimated. This is described in:

(4) "Speech Recognition based Probability Model" Electronic Information Communication Institutes, 1988, Chapter 3, Section 3.3.5, pp. 79 -80, by Seiichi Nakagawa.

On the other hand, there is a method in which two types of vector quantization are performed, one for static spectrum for each frame and the other for the variation of the spectrum on a time axis to represent a transitional variation pattern of speech by the resultant pair of labels This is disclosed in:

(5) "HMM Based Speech Recognition Using Multi-Dimensional Multi-Labeling" Proceedings of ICASSP '87, Apr. 1987, 37-10 by Masafumi Nishimura and Koichi Toshioka.

Although, according to this method, the transitional variation pattern of speech may be expressed without a large increase of the amount of calculation and storage, for the vector quantization, about $N^2$ parameters must be estimated for each state of the Markov model, when the number of patterns of each feature amount is N. It is still difficult to accurately estimate all the parameters with a small amount of speech data, and the amount of storage required is also large.

SUMMARY OF THE INVENTION

The invention provides a speech recognition system based on Markov models capable of highly accurate recognition, paying attention to speech transitional features without a large increase in the amount of calculation and storage.

The invention is based on the knowledge that the correlation is very small between the static spectrum and the spectrum variation over several frames, and is intended to greatly reduce the number of parameters by preparing Markov models by label, having independent label output probability for the spectrum and the spectrum variation. FIG. 9 shows examples of correlation values between the spectra (A-A), the spectrum variations (C-C) and the spectrum and the spectrum variation (A-C) in absolute values. In the figure, the suffix indicates a dimension. As can be understood from this figure, the correlation between the spectrum and the spectrum variation is much smaller than those between the spectrums, and between the spectrum variations in different dimensions.

The invention independently vector-quantizes the spectrum A(t) representing the static features of speech on the frequency axis and the variation pattern C(t) of the spectrum on the time axis (for example, a linear recursive coefficient of the spectrum variation). The resultant two label trains La(t) and Lc(t) are evaluated in Equation 1 (below) based on the knowledge that there is a small correlation between them. In Equation 1, W designates a Markov model representing a word; I =i1, i2, i3, ... iT, designates a state train; Ma and Mc designate label-based Markov models corresponding to the spectrum and the spectrum variation, respectively; and $B_{ij}$ designates a transition from the state i to the state j P(La|LcW) is calculated for each Markov mr,del W representing a word. The model W having the maximum probability value is the recognition result.

$$P(La,Lc|W) = \sum_I P(La,Lc|I,W)P(I|W)$$

$$= \sum_I P(La(1)|Ma(i1))P(Lc(1)|Mc(i1))$$

$$P(B_{i1,i2}|Ma(i1),Mc(i1)) \cdot$$

$$P(La(2)|Ma(i2))P(Lc(2)|Mc(i2))$$

$$P(B_{i2,i3}|Ma(i2),Mc(i2))\ldots$$

$$P(La(T)|Ma(iT))P(Lc(T)|Mc(iT))$$

$$P(B_{iT,iT+1}|Ma(iT),Mc(iT))$$

(Equation 1)

This model has independent label output probability tables P(La(t)|Ma(it)), P(Lc(t)|Mc(it)) for the spectrum pattern and the spectrum variation pattern, respectively. On the other hand, the transition occurrence probability is expressed in a form depending on both features. This is because, even if storage is saved by assuming independency in this area, it is not desirable from the viewpoint of overall efficiency for the following reasons: The size of the transition occurrence probability table is generally small, both features are not completely independent from each other, the amount of calculation is increased, and the increase in the number of multiplications affects the accuracy in calculating the likelihood.

Here, Ma and Mc are label-based Markov models corresponding to the spectrum and the spectrum variation, respectively. Such Markov model by label is called a "fenonic" or "fenemic" Markov model. This model is based on the label train of the speech. Models related by the same label name are treated as a common model at the times of training and recognition. The fenonic Markov model representing a word is called a "word base form". The fenonic Markov model is explained in detail in the following paper.

(6) "Acoustic Markov Models Used in the Tangora Speech Recognition System", Proceedings of ICASSP'88, Apr. 1988, S11-3, by L.R. Bahl, P.F. Brown, P.V. de Souza, R.L. Mercer and M.A. Picheny.

It is to be noted that the invention may be modified in various manners such as making phonemes the units subject to the recognition.

Although the attention is paid to the spectrum and the spectrum variation in the above explanation, other pairs of features having a small correlation between them may also be employed. For example, the spectrum and the rhythm data (pitch pattern) may be utilized.

BRIEF DESCRIPTION OF THE DRAWINGS

FIGS. 3 and 4 are diagrams for explaining the operation of the word baseform registration unit 15, the model parameter estimation unit 16 and the recognition unit 17.

FIG. 7 is a flow chart for explaining the operation of the recognition unit 17.

DESCRIPTION OF THE PREFERRED EMBODIMENTS

Figure 1:
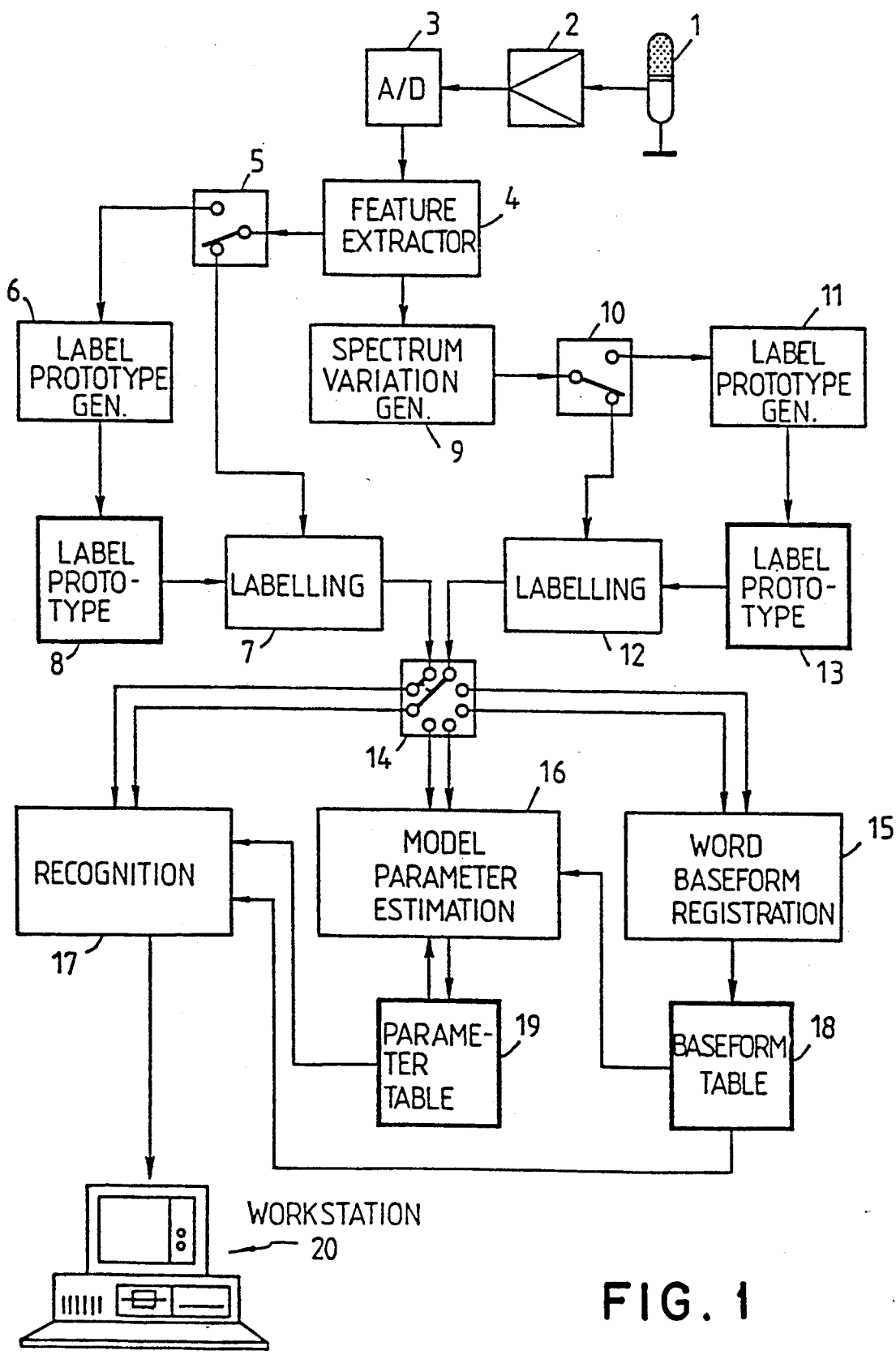
FIG. 1 is a block diagram showing an embodiment according to the present invention.

Now, an embodiment of the invention in which the invention is applied to word speech recognition based on a fenonic Markov model will be explained by referring to the drawings. FIG. 1 shows this embodiment as a whole. In FIG. 1, input speech data is supplied through a microphone 1 and an amplifier 2 to an analog/digital (A/D) converter 3 where it is converted into digital data. The digitized speech data is fed to a feature extractor 4. In the feature extractor 4, the speech data is subject to DFT (Discrete Fourier Transform) and critical bandwidth filtering to produce a spectrum signal A(t). Spectrum signal A(t) contains, for example, 20 bandwidth channels on which auditory characteristics are reflected.

The output is supplied to a switching unit 5 in the next stage every 8 msec., and then to either a label prototype generating unit 6 or a labelling device 7.

In generating label prototypes, the switching unit 5 is switched to the label prototype generating unit 6 for supplying the spectrum from the feature extractor 4. The label prototype generating unit 6 generates a label prototype dictionary 8 for 128 spectra by clustering.

The output of the feature extractor 4 is also fed to a spectrum variation generating unit 9. The spectrum variation generating unit 9 has a ring buffer capable of holding the spectrum data for the latest nine frames, and the spectrum data is stored in this buffer every 8 msec. If it is assumed that the latest data is A(t), the spectrum variation C(t) around A(t−4) is determined in accordance with Equation 2 by using the data for nine frames from A(t) to A(t−8).

$$Ci(t) = \sum_{n=-4}^{4} (nAi(t - 4 + n))$$

(Equation 2)

wherein i represents the vector dimension of each feature and i =1, ..., 20.

The spectrum variation is also supplied to a switching unit 10 in the next stage every 8 msec., and then to either a prototype generating unit 11 or a labelling unit 12. In generating label prototypes, the switching unit 10 is switched to the label prototype generating unit 11 where a label prototype dictionary 13 for 128 spectrum variations is generated through clustering in a similar way to that for the spectrum In performing recognition, the switching units 5 and 10 are switched to the labelling units 7 and 12, respectively, when word base forms are registered and when parameters of Markov models are estimated. The labelling units 7 and 12 successively perform labelling by referring to the label prototype dictionaries 8 and 13, respectively. The labelling unit 7 contains a four-frame delay circuit so that labels for the spectrum of a frame and the spectrum variation centering around the same frame can be synchronously obtained every 8 msec.

Figure 2:
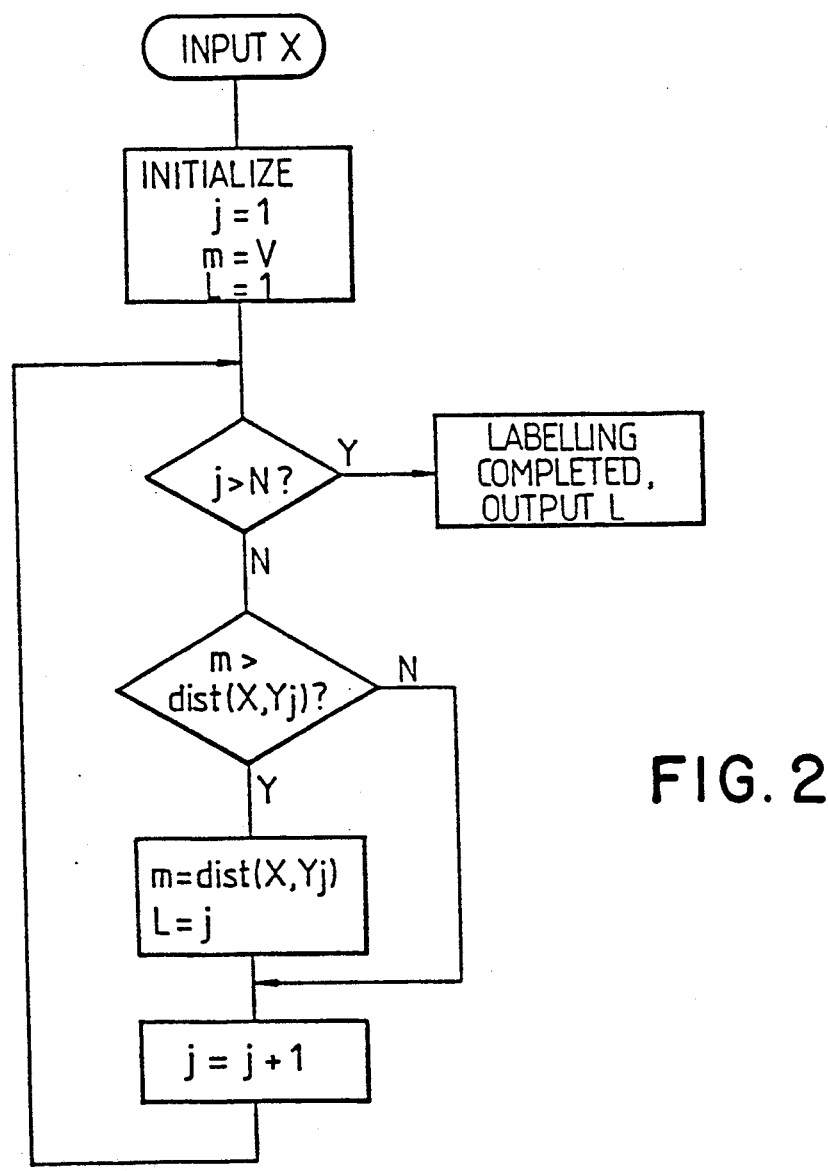
FIG. 2 is a flow chart for explaining the labelling units 7 and 12 in FIG. 1.

Labelling is, for example, performed in a way shown in FIG. 2. In the FIG. X is an input feature; Yj is the feature of the j-th prototype; N is the number of prototypes (=128); dist(X, Y) is a Euclidian distance between X and Yj; and m is the minimum value of dist (X, Y) at each time point. m is initially set to an extremely large value V. As can be seen from FIG. 2, the input feature quantity X is successively compared with each of the prototype feature quantities and the most likely one, that is, the one having the shortest distance is outputted as an observed label (label number) L. This procedure is applicable to both labelling units 7 and 12 in exactly the same manner.

Returning to FIG. 1, labels outputted from the labelling units 7 and 12 are supplied in pairs to either a word baseform registration unit 15, a model parameter estimation unit 16 or a recognition unit 17 through a switching unit 14. The operations of the word baseform registration unit 15, the model parameter estimation unit 16 and the recognition unit 17 will be explained in detail later with reference to the figures following FIG. 2.

In forming word baseform registration, the switching unit 14 is switched to the word baseform registration unit 15 to supply label pairs to it. The word baseform registration unit 15 produces a word baseform table 18 using the label pair stream.

In estimating parameters of a Markov model, the switching unit 14 is switched to the model parameter estimation unit 16 that trains the model by using the label pair stream and the baseform table 18, and determines parameter values in a parameter table 19.

In performing recognition, the switching unit 14 is switched to the recognition unit 17 that recognizes input speech based on the label pair train, the baseform table 18 and the parameter table 19.

Output of the recognition unit 17 is fed to a workstation 20, and displayed, for example, on its display unit. In FIG. 1, all units other than the microphone 1, the amplifier 2, the A/D converter 3 and the display unit 20 are implemented in the form of software on the workstation. The workstation used was an IBM 5570 processing unit on which Japanese DOS was used as the operating system, and language C and the macro assembler were used as languages. Alternatively, these elements of the invention may be implemented as hardware.

Now, the word baseform registration unit 15, the model parameter estimation unit 16 and the recognition unit 17 will be explained in detail.

Figure 3:
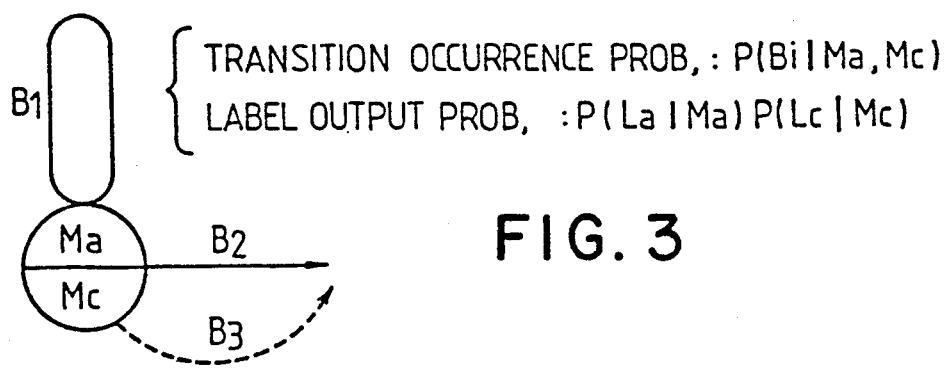

FIG. 3 shows the structure of a fenonic Markov model used in the embodiment wherein Ma is a fenonic Markov model corresponding to the spectrum, and Mc is a fenonic Markov model corresponding to the spectrum variation. As shown in FIG. 4, separate parameter tables for each of models Ma and Mc are prepared for the label output probability, while a joint parameter table for the pair of Ma and Mc is prepared for the transition occurrence probability. There are three types of transitions: a transition to itself ($B_1$), a label-producing transition to the next state ($B_2$) and a transition to the next state without outputting a label ($B_3$).

Figure 5:
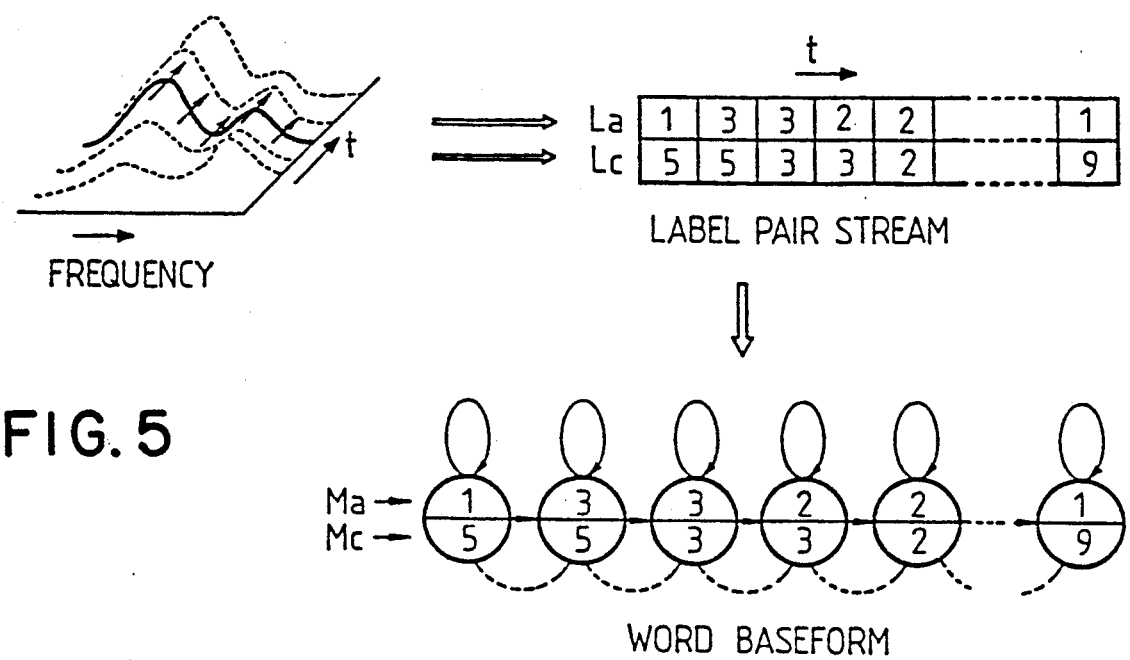
FIG. 5 is a diagram for explaining the operation of the word baseform registration unit 15.

First, the operation of the word baseform registration unit 15 will be explained with reference to FIGS. 3 and 5. FIG. 5 shows a schematic diagram of an example of a configuration of the baseform, and a manner for generating it. In the figure, the input speech spectrum and the spectrum variation are first labelled to provide two label trains La and Lc. Fenonic Markov models shown in FIG. 3 are successively linked to the label numbers in one-to-one correspondence. The linked fenonic Markov models are called a "baseform".

Thus, a word baseform is generated from the actual utterance of each word to be recognized, and is registered in the baseform table. In the embodiment, the respective labels La and Lc of the spectrum and the spectrum variation are caused to correspond to the respective Ma and Mc in one-by-one correspondence so that 128 kinds of Ma and Mc, which are the same number of the kinds of the labels, are prepared. It should be noted that the one-to-one correspondence is not necessarily required.

Figure 6:
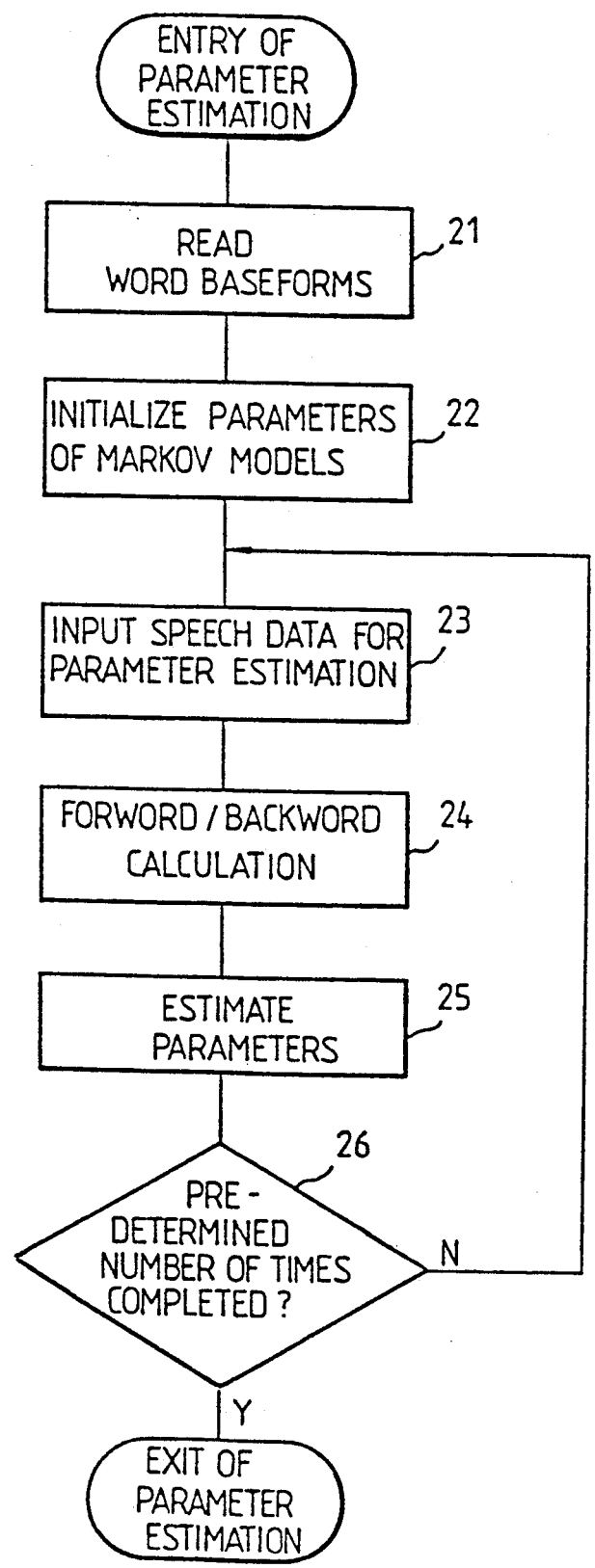
FIG. 6 is a flow chart for explaining the operation of the model parameter estimation unit 16.
Figure 9:
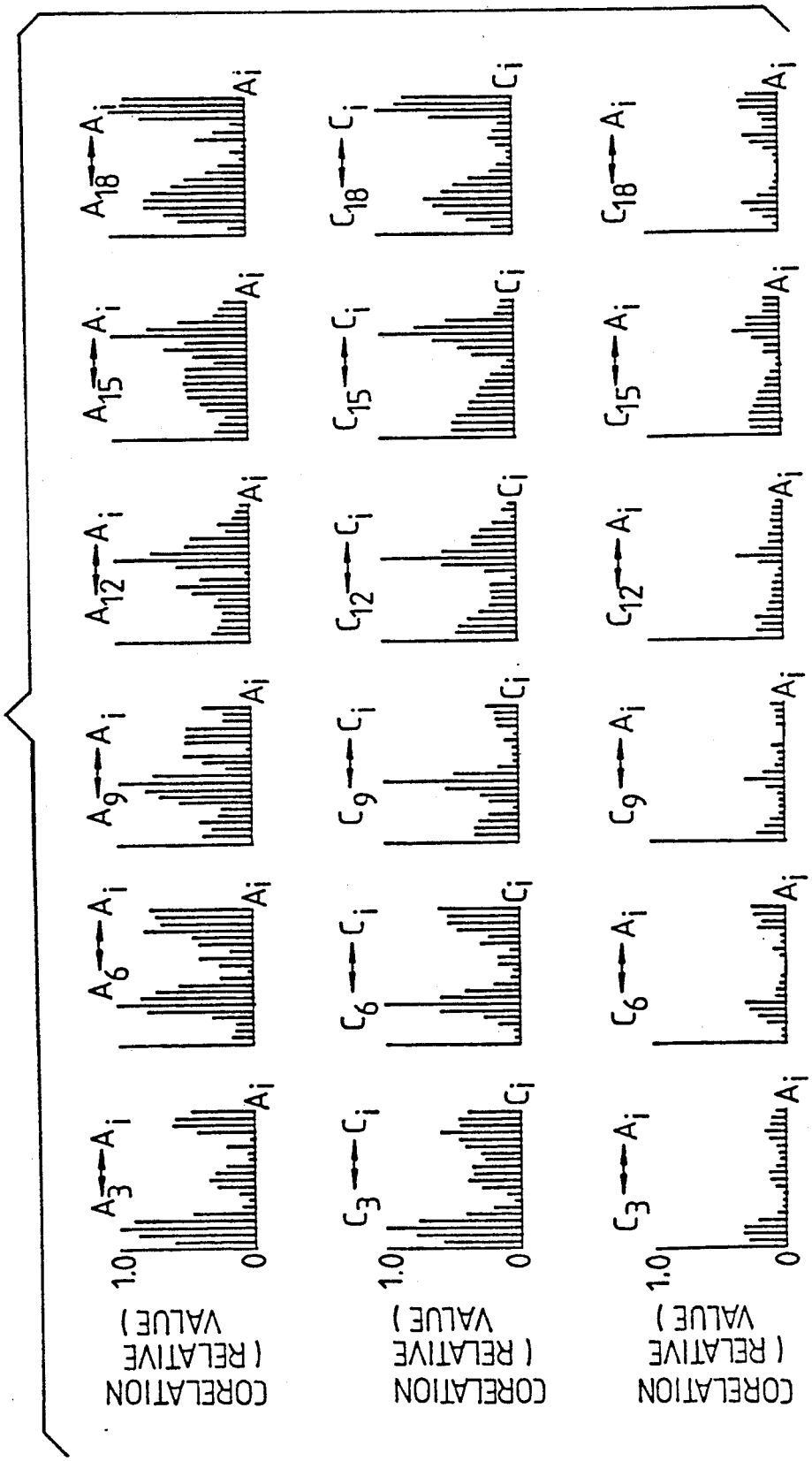
FIG. 9 is a diagram showing the correlation between feature quantities.

The operation of the model parameter estimation unit 16 of Markov model will be explained by referring to FIGS. 3 through 6. FIG. 6 shows a procedure for estimating the parameters of the model. In the figure, all word baseforms for estimating the parameters are first read (step 21). Then, the parameters of the fenonic Markov models shown in FIG. 4, that is, the label output probability $P(La|Ma)$, $P(Lc|Mc)$ and the transition occurrence probability $P(Bi\ Ma,Mc)$ are initialized (step 22). In this example, the value of each parameter is initialized on the assumption that the transition occurrence probability is provided when $B_1$, $B_2$ and $B_3$ are 0.1, 0.8 and 0.1, respectively, and that the label output probability is uniformly outputted at a probability of 0.6 when the number for the model is same as that of the label, or at a probability of 0.4/127 when they are different number. FIG. 4 shows examples of the values of the parameters when the estimation has been completed. After the Markov model is initialized as just described, the speech data for estimating the parameters is inputted (step 23). The speech data for estimating the parameters is a label pair stream obtained by uttering the vocabulary to be recognized ten times. When the input of the speech data is completed, forward and backward calculation is carried out for the combination of each speech data and the corresponding word baseform (step 24). After the calculation is performed for all speech data used for estimating the parameters, the parameters for all fenonic Markov models are estimated (step 25). The fenonic Markov model is characterized by the fact that the vocabulary for estimating the parameters does not necessarily coincide with the vocabulary subject to recognition, so that the parameters may be estimated for a completely different vocabulary. The estimation of the parameters for the fenonic Markov models is completed after repeating the above-mentioned process that is, Steps 23-25, a predetermined number of times, for example, five times, by using newly estimated parameters.

The operation of the recognition unit 17 will be explained with reference to FIG. 7, wherein W represents a word baseform; La and Lc are label trains of input speech; and $P(La, Lc|W)$ is a likelihood of the input speech for the word W. m is the maximum value of $P(La, Lc|W)$ up to each time point and is initially set at 0. In this figure, the parameters of the fenonic Markov models are first read (step 27). Once the label trains La and Lc of the speech data are inputted (step 28), the baseforms for the word W are successively read (step 29), and the likelihood $P(La, Lc|W)$ is calculated in accordance with Equation 1 (step 30). This portion may be carried out by the Viterbi algorithm. In FIG. 7, the equation in block 30 is shown in product notation, but is the same as Equation 1, above. Thus, P(La, Lc|W) is successively found for each word baseform, and one of the vocabulary to be recognized giving the largest likelihood is outputted as the recognition result (word number) R (step 34).

An evaluation experiment has been carried out for 150 words as the vocabulary to be recognized having a close similarity such as "Keihoh", "Heikoh", "Chokusen" and "Chokuzen" which were obtained through thirteen utterances by two male speakers (a combination of ten utterances for training and three utterances for recognition)

Figure 8:
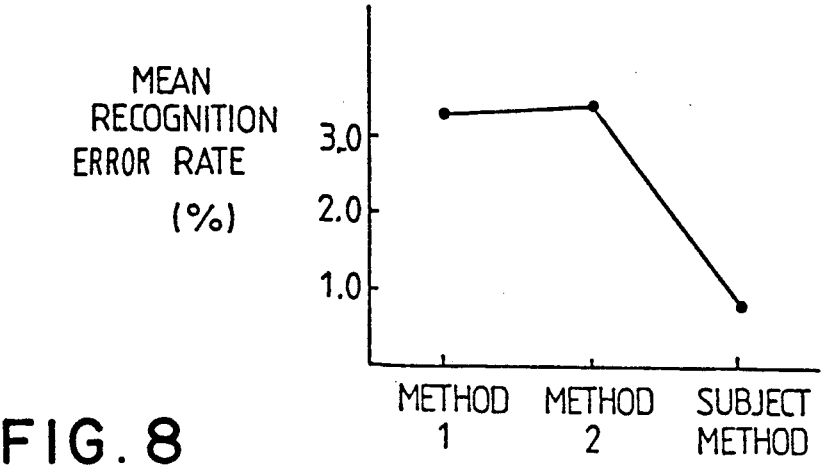
FIG. 8 is a diagram showing experimental data resulting from use of the invention.

FIG. 8 shows the result of the experiment, where the horizontal axis represents the recognition method, and the vertical axis represents an average recognition error rate. The method 1) represents a speech recognition method based on fenonic Markov models which produce only spectrum labels The method 2) represents a speech recognition method based on fenonic Markov models which produce only spectrum variation labels. The method 3) represents the present invention.

It is understood from this result that according to the present invention much higher recognition may be achieved compared with the conventional methods. Furthermore, the calculation burden and the memory burden of the present invention are not much greater than the conventional fenonic Markov model method, which evaluates only the spectrum.

Having thus described my invention, what I claim as new, and desire to secure by Letters Patent:

1. A speech recognition system comprising:
    a means for generating spectrum data from input speech in every predetermined time interval;
    a means for quantizing said spectrum data by using a predetermined spectrum prototype set for recognition, each spectrum prototype having an identifier, and for generating a recognition spectrum prototype identifier corresponding to each of said spectrum data;
    a means for generating spectrum variation data from said input speech in each said time interval;
    a means for quantizing said spectrum variation data by using a predetermined spectrum variation prototype set for recognition, each spectrum variation prototype having an identifier, and for generating a recognition spectrum variation prototype identifier corresponding to each of said spectrum variation data;
    a means for storing a plurality of probabilistic models corresponding to speech of said time interval, and identified by model identifiers relating to the spectrum data and model identifiers relating to the spectrum variation data, each of which models has one or more states, transitions from said states, probabilities of said transitions, output probabilities for outputting each of said recognition spectrum prototype identifiers at each of said states or said transitions, and output probabilities for outputting each of said recognition spectrum variation prototype identifiers at each of said states or said transitions;
    a means for estimating, for each of a plurality of words, each word represented by a series of probabilistic models from the storage means, a likelihood that a series of spectrum prototype identifiers and a series of spectrum variation prototype identifiers generated from an utterance of the word will be the same as the spectrum prototype identifiers and spectrum variation prototype identifiers generated from the input speech; and
    a means for outputting the word having the highest likelihood.

2. A speech recognition system according to claim 1, wherein each of said probabilistic models has one state, a transition from said state to the same state while outputting one of said recognition spectrum prototype identifiers and one of said recognition spectrum variation prototype identifiers, a transition from said state to a next state while outputting one of said recognition spectrum prototype identifiers and one of said recognition spectrum variation prototype identifiers, and a transition from said state to the next state without outputting said identifiers.

3. A speech recognition system according to claim 2, wherein said unit to be recognized is a word.

4. A speech recognition system comprising:
    a means for generating first feature data from input speech in every predetermined time interval;
    a means for quantizing said first feature data by using a predetermined first feature prototype set for recognition, each first feature prototype having an identifier, and for generating a recognition first feature prototype identifier corresponding to each of said first feature data;
    a means for generating second feature data having a small correlation with said first feature from said input speech in each said time interval;
    a means for quantizing said second feature data by using a predetermined second feature prototype set for recognition each second feature prototype having an identifier, and for generating a recognition second feature prototype identifier corresponding to each of said second feature data;
    a means for storing a plurality of probabilistic models corresponding to speech of said time interval, and identified by model identifiers relating to said first feature and model identifiers relating to said second feature, each of which models has one or more states, transitions from said states, probabilities of said transitions, output probabilities for outputting each of said recognition first feature prototype identifiers at each of said states or said transitions, and output probabilities for outputting each of said recognition second feature prototype identifiers at each of said states or said transitions;
    a means for estimating, for each of a plurality of words, each word represented by a series of probabilistic models from the storage means, a likelihood that a series of first feature prototype identifiers and a series of second feature prototype identifiers generated from an utterance of the word will be the same as the first feature prototype identifiers and the second feature prototype identifiers generated from the input speech; and
    a means for outputting the word having the highest likelihood.

5. A speech recognition system comprising:
    means for generating a first alphabet of labels from a speech input, each label representing a sound of a selected time duration;
    means for generating a second alphabet of labels from a speech input, each label representing a sound of a selected time duration, the labels of the first alphabet having a small correlation to the labels of the second alphabet;

means for forming a first probabilistic model for a first word, and for forming a second probabilistic model for a second word, each model comprising (a) at least first and second states, (b) at least one transition extending from the first state back to the first state, or from the first state to the second state, (c) a transition probability for each transition, (d) at least one output probability that an output label belonging to the first alphabet of labels will be produced at the transition, and (e) at least one output probability that an output label belonging to the second alphabet of labels will be produced at the transition;

means for representing an utterance to be recognized as a first sequence of labels from the first alphabet and as a second sequence of labels from the second alphabet;

means for determining, from the probabilistic model for each word, the probability that utterance of the word will produce the first and second sequences of labels; and means for identifying the utterance to be recognized as the word with the highest probability of producing the first and second sequences of labels.

6. An apparatus for modeling words, said apparatus comprising:

means for measuring the values of at least first and second features of an utterance of a first word, said utterance occurring over a series of successive time intervals of equal duration Δt, said means measuring the first and second feature values of the utterance during each time interval to produce a series of feature ectoro signals representing the first and second feature values, said first feature value having a small correlation to the second feature;

means for storing a set of first label prototype signals LLP1,i, where i is a positive integer, each first label prototype signal having at least a first parameter value;

means for storing a set of second label prototype signals LP2,j, where j is a positive integer, each second label prototype signal having at least a second parameter value;

means for storing a finite set of probabilistic model signals Mi,j, each probabilistic model signal representing a probabilistic model of a component sound;

means for comparing the first and second feature values, of each feature vector signal in the series of feature vector signals produced by the measuring means as a result of the utterance of the first word, to the parameter values of the first and second label prototype signals, respectively, to determine, for each feature vector signal, the closest pair of associated label prototype signals LP1,i and LLP2,j, respectively;

means for forming a baseform of the first word from the series of feature vector signals by substituting, for each feature vector signal, the closest pair of associated label prototype signals LPq, and LP2,j to produce a baseform series of pairs of label prototype signals; and means for forming a probabilistic model of the first word from the baseform series of pairs of label prototype signals by substituting, for each pair of label prototype signals LP1,i and LP2,j an associated probabilistic model signal M1,j from the storage means, to produce a series of probabilistic model signals.

7. An appearance as claimed in claim 6, characterized in that:

each probabilistic model signal $M_{i,j}$ represents a probabilistic model comprising (a) at least first and second states, (b) at least one transition $T_1$ extending from the first state back to the first state, or from the first state to the second state, and (c) at least one output probability $P(LP_{1,i}|T_1)$ that a first label prototype signal $LP_{1,i}$ will be produced at the transition $T_1$; and there is at least one label prototype signal $LP_{1,1}$ such that the value of the probability $P(LP_{1,1}|,T_1)$ for models $M_{1,j}$ is the same for all values of j.

8. An apparatus as claimed in claim 6, characterized in that the value of the second feature at a time interval is a function of the variation in the value of the first feature at the time interval.

* * * * *